(12) United States Patent
Ohtsuka et al.

(10) Patent No.: US 6,372,845 B1
(45) Date of Patent: Apr. 16, 2002

(54) RESINOUS COMPOSITION AND SHEET PRODUCT THEREFROM

(75) Inventors: Yoshihiro Ohtsuka, Ohtake; Tohru Matsuda, Matsudo; Shizuo Maeda, Sennan; Kouichi Ishiihara, Sennan; Yoshikazu Hida, Sennan, all of (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/429,620

(22) Filed: Oct. 29, 1999

(30) Foreign Application Priority Data

Nov. 5, 1998 (JP) .......................... 10-330195
Nov. 5, 1998 (JP) .......................... 10-330196

(51) Int. Cl.[7] .............................. C08L 53/02
(52) U.S. Cl. ..................... 525/93; 525/95; 525/96; 525/99; 525/332.9; 525/333.3; 525/338; 525/387
(58) Field of Search ................ 525/93, 95, 99, 525/227, 228, 230, 238, 240, 241, 96, 332.9, 333.3, 338, 387

(56) References Cited

U.S. PATENT DOCUMENTS 5,962,591 A * 10/1999 Ngoc et al. ................. 525/229

FOREIGN PATENT DOCUMENTS

| EP | 0249998 | * | 6/1987 |
| EP | 0658603 A2 | | 6/1995 |
| EP | 0874022 A1 | | 4/1997 |
| GB | 2329182 A | | 3/1999 |
| JP | 6049292 | | 2/1994 |
| JP | 06049292 | * | 2/1994 |
| KR | 9606624 B | * | 6/1987 |

OTHER PUBLICATIONS

Furukawa, CAPLUS AN 1994:510619, Abstracting JP06049292.*
CAPLUS AN 2000:623985, May 1996.*
European Search Report dated Mar. 15, 2000.

* cited by examiner

Primary Examiner—Jeffrey Mullis
(74) Attorney, Agent, or Firm—Armstrong, Westerman & Hattori, LLP

(57) ABSTRACT

A blended composition consisting of a thermoplastic olefin resin (Comp. A) with an acrylonitrile-styrene-alkyl acrylate copolymer (Comp. B) was attempted to create substitution for vinyl chloride compound prepared from vinyl chloride resin proper and a plasticizer, but resulted in inferior interdispersibility. Incorporation of an epoxy resin (Comp. C) has brought definite improvement in the interdispersibility. A resinous composition including the components A, B, and C has the utility of substitution for vinyl chloride compounds as well as its products. (Comp. C) is selected from the group consisting of epoxidized diene block copolymers including, in their molecules, a block prepared by polymerization from a vinyl aromatic monomer and another block prepared by polymerization from a conjugated diene monomer, wherein remnant diene groups after the polymerization have been epoxidized or further partially hydrogenated.

3 Claims, 2 Drawing Sheets

RESINOUS COMPOSITION AND SHEET PRODUCT THEREFROM

FIELD OF THE INVENTION

This invention relates to resinous compositions free of the dioxin hazards or to thermoplastic resin compositions containing no halogen element, whose utility lies in achieving the commercial value of vinyl chloride resin or its compound. Particularly, this invention substantially relates to new resinous compositions comprising an olefin resin, and a styrene-acrylonitrile based resin with incorporation of an epoxy group-containing resin as third component, and to improved sheet products therefrom.

DESCRIPTION OF THE RELATED ART

Vinyl chloride resin has found a large market for the value of its popular price as well as technically its good compatibility with plasticizers (DOP, DBP) and hence has extended the products to wide range, from hard manufactures to soft articles. For instance, vinyl chloride products have prevailed in such end uses as: toys, stationary articles, rain protection wearings, ornamental coverings, in the personal as well as household article field, and industrially the covering for applications in car interior fittings; panels, cushions, further in general packaging or wrapping purposes. Of them, one strong market has lain in sheet products, because the vinyl chloride sheet or film is well suited to processing by the high frequency (HF) welding machines. However, such largely grown market has caused environmental problems because of inclusion of chlorine, a kind of halogen elements, such as heavy damage or corrosion to the incineration apparatus in the recycling process of vinyl chloride products and environmentally the generation of dioxin, harmful substance. Thus, industrially there has been desired the advent of a substitution for vinyl chloride products or something else which is free of halogen element and well suited to the HF welding.

Attempts intended to find a resinous composition provided with the freeness of vinyl chloride component as well as the suitability to the HF welding were made in a patent application (Japanese Unexamined Patent Publication Hei 6-80838), wherein an olefin resin was blended with an ethylene-ethyl acrylate-maleic anhydride copolymer, and in another patent application (Japanese Unexamined Patent Publication Hei 8-302144), wherein an olefin resin was blended with an acrylonitrile-styrene copolymer. However, such prior attempts resulted in so poor or inferior compatibility and hence the HF welder suitability, moldability, as well as appearance of sheet products were not commercially acceptable.

SUMMARY OF THE INVENTION

One aspect of this invention relates to resinous compositions whose features are:
(Comp. A) a thermoplastic olefin resin accounting for 99 to 1 wt. parts,
(Comp. B) an acrylonitrile-styrene-alkyl acrylate copolymer accounting for 1 to 99 wt. parts,
based on 100 wt. parts of Comp. (A+B), to which an epoxy resin (Comp. C) is mixed as a third component into the composition in a range of 1 to 100 wt. parts based on 100 wt parts of (A+B).

Another aspect of this invention relates to sheet products manufactured from the resinous compositions as noted above, whose features lie in well suitability to the HF welding, moldability, as well as commercially acceptable appearance.

The blend ratios as noted above between the components A, B, and C are determined by experimental findings, wherein in the case of sheet products, preferred conditions are such that in the system A+B, A accounts for more than 50%, and in the system C+(A+B), (A+B) accounts for more than 50%. In addition to such resin blend, other functional agents or chemicals such as antioxidant, UV absorber, pigment, filler are to be blended according to the end use or technical requirements or general knowledge in the art.

Sheet products in this invention include various product forms such as sheet proper, laminate with another substrate, foamed sheet.

DETAILED DESCRIPTION OF THE INVENTION

Figure 1:
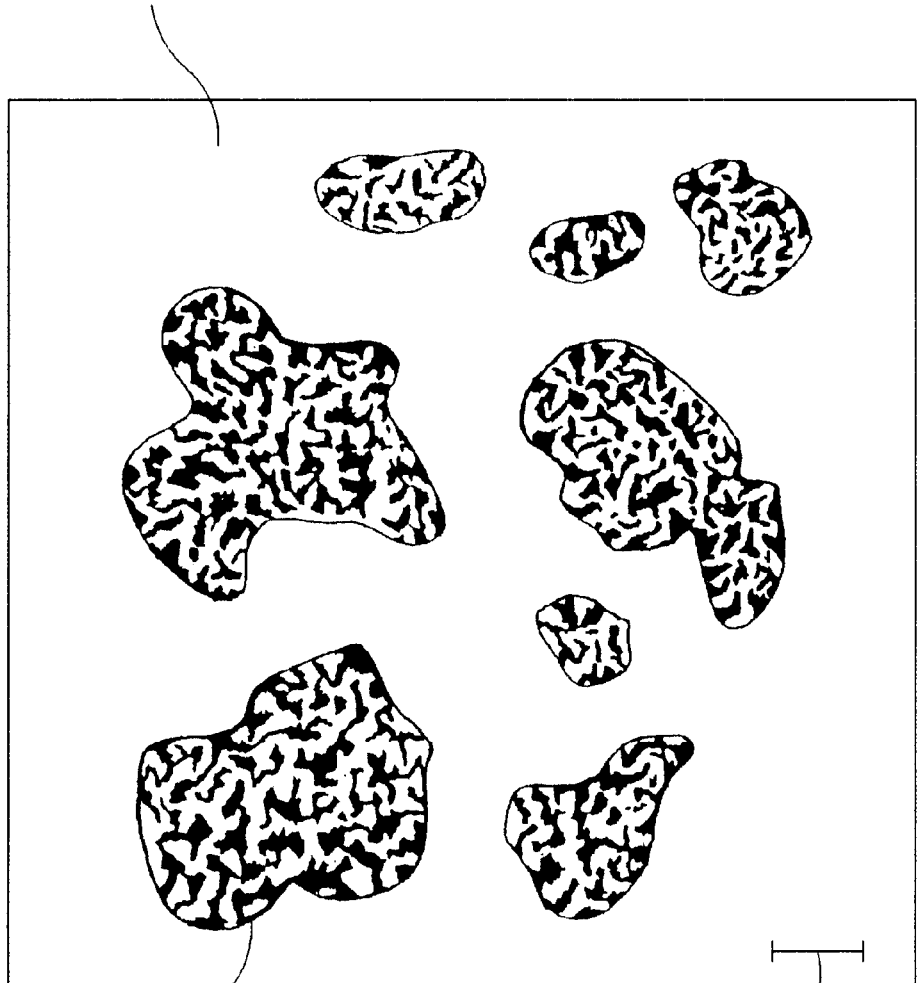
FIG. 1 shows the reproduction of a photograph imaged by scanning electron microscope (SEM) for illustration of a mixture status found in a resinous composition of the present invention comprising an olefinic thermoplastic resin (Comp. A), an acrylonitrile-styrene-alkyl acrylate copolymer (Comp. B), and an epoxy group-containing resin (Comp. C).

Respective components for constituting an inventive resinous composition will be described in the following:

(Comp. A) Olefinic Thermoplastic Resins

Olefinic thermoplastic resins include: polyethylene (high density polyethylene, low density polyethylene, linear polyethylene), polypropylene, ethylene-propylene (random) copolymer, ethylene-butene (random) copolymer, ethylene-methyl methacrylate copolymer, ethylene-ethyl acrylate copolymer, ethylene-vinyl acetate copolymer, ethylene-vinyl alcohol copolymer, ethylenic ionomer resin, olefinic thermoplastic elastomers (for example, hard segment: polypropylene, soft segment: ethylene/propylene copolymer), wherein an additional component as a third one may be included for modification.

(Comp. B) Acrylonitrile-styrene-alkyl Acrylate Copolymers

This titled term indicates rubbery resins comprising the three elements: acrylonitrile, styrene, and alkyl acrylate as essential elements, wherein an alkyl acrylate is: butyl acrylate, 2-ethylhexyl acrylate, methyl methacrylate, methyl acrylate, ethyl methacrylate, ethyl acrylate, pentyl acrylate, hexyl acrylate, for example, wherein at least one kind of alkyl acrylate is employed.

Further, Comp. B includes those that are partially crosslinked with use of bi- or tri-functional acrylates, bi- or tri-functional methacrylates, or divinyl benzene.

Such Comp. B as described above is known and may be prepared by radical-type emulsion polymerization at a temperature above 30° C. For example, Japanese Unexamined Patent Publication Hei 6-322037/1994 discloses such art as employable in this preparation, and Goodyear's commercial product named SUNIGUM falls in the concept of Comp. B.

(Comp. C) Epoxy Group-containing Resins

This titled term indicates, generally, (i) epoxy resins or (ii) copolymers containing an epoxy group. Those are required to have at least one epoxy group in its molecule, and no further limitation.

Examples of (i) epoxy resins are: bisphenol-A based epoxy resin, bisphenol-F based epoxy resin, cresol novolac based epoxy resin, alicyclic epoxy resin, phenol novolac based epoxy resin, wherein preferred are Epikote series by Shell Oil: Epikote-828, -1001, -1004, -1009, or equivalents thereof, such as, Epiclon series by Dainippon Ink & Chemicals: Epiclon-830, and other choices are: 3,4-epoxy cyclohexyl methyl-3,4-epoxy cyclohexane carboxylate by Daicel Chemical Industries, commercially named, Celloxide 2021, wherein blend use or non blend use thereof is permitted.

(ii) A copolymer containing an epoxy group may be any of block-, random-, and graft-copolymer. An epoxy group may be introduced in the preparing process of such copolymer or after the preparation thereof. Technically, it is feasible by radical polymerization or addition reaction of methacrylate compound having an epoxy group, such as glycidyl methacrylate or the like, or by oxidation of diene type copolymer with use of peroxide.

From among resins including epoxy groups, preferred as Comp. C is a resin whose epoxy group is introduced by the conversion from double bonds present in a diene type block copolymer (*). Vinyl aromatic monomers for constituting a diene type block copolymer (*) are such as, styrene, alpha-methyl styrene, vinyl toluene, p-tertiary butyl styrene, divinyl benzene, p-methyl styrene, 1,1-diphenyl styrene, and one or more of such constituents as noted may be chosen. Most preferred is styrene. And conjugated diene monomers for constituting the diene type block copolymers (*) are such as, butadiene, isoprene, 1,3-pentadiene, 2,3-dimethyl-1,3-butadiene, piperylene(pentadiene), 3-butyl-1,3-octadiene, phenyl-1,3-butadiene, and one or more of such constituents as noted may be chosen. Most preferred are butadiene, isoprene and joint use thereof.

Details Related to the Diene Type Block Copolymer (*)

The diene type block copolymer (*) herein indicates a block copolymer composed of a block A substantially constituted with a segmentary polymer prepared from vinyl aromatic monomers and a block B substantially constituted with another segmentary polymer prepared from conjugated diene monomers, wherein an overall copolymerization or share ratio between the vinyl aromatic monomers (A) and the conjugated diene monomers (B) ranges from 5/95 to 85/15, preferably from 10/90 to 80/20. And preferable requirements for the diene type block copolymer (*) of the present invention lie in its number average molecular weight (Mn), specifically Mn=5,000–600,000, preferably 10,000–500,000, and also in its molecular weight distribution [a ratio (Mw/Mn) between the weight average molecular weight (Mw) and the number average molecular weight (Mn)], specifically the ratio (Mw/Mn) ranges less than 10, wherein a molecular configuration of the block copolymer (*) may be linear, branched, star like, or any combination thereof. That is illustrated by A-B-A, B-A-B-A, (A-B-)$_4$Si, or A-B-A-B-A, wherein 'A' stands for the segment or block A, 'B' stands for the segment or block B, and 'Si' stands for silicon element. Further unsaturated bonds contained or remnant in the block copolymer (*) may be subjected to partial hydrogenation.

The preparation of such block copolymers (*) is feasible by any known processes. Japanese Examined Patent Publication Sho 40-23798/1965, Sho 43-17979/1968, Sho 46-32415/1971, and Sho 56-28925/1981 illustrate the preparation of block copolymers (*) composed of vinyl aromatic blocks and conjugated diene blocks through the process with use of lithium catalysts in the circumstances of an inert solvent. And Japanese Examined Patent Publication Sho 42-287040/1967, Sho 43-6636/1968, Japanese Unexamined Patent Publication Sho 59-133203/1984 illustrate such processes to prepare such partially hydrogenated block copolymers with use of hydrogenation catalysts in the circumstances of an inert solvent.

The process for converting unsaturated bonds remnant or present in the block copolymer molecules to epoxy groups or epoxidation will complete the preparation of an epoxy modified block copolymers (*), Comp. C in the present invention.

The epoxidation is feasible by reacting such block copolymers (*) as noted above with a hydroperoxide or peracid in an inert solvent. Preferred peracids are: performic acid, peracetic acid, perbenzoic acid, trifluoro-peracetic acid, wherein peracetic acid is most preferable since it is available as a popular commercial product, and has good stability. An appropriate oxirane oxygen concentration of the present invention ranges from 02. to 6.0 wt. %, preferably from 0.5 to 5.6 wt %.

Reference Example 1

Epoxidation of a Diene Block Copolymer

A block copolymer (polystyrene-polybutadiene-polystyrene, by JSR Corp. commercially named TR2000) 300 g, and ethyl acetate 1500 g were charged into a reaction vessel equipped with a jacket, a stirrer, a reflux condenser, and a thermometer. After the block copolymer was dissolved, another ethyl acetate solution 160 g containing peracetic acid at a concentration of 30 wt % was instilled continuously thereinto, and thus the epoxidation reaction was kept with stirring for 3 hours at 40° C. and then cooled to a room temperature, and the reactant solution was discharged, into which a massive volume of methanol was added and the polymer intended was separated or precipitated, and then subjected to filtration, water washing, and drying. The product thus recovered, epoxidized diene copolymer had an oxirane oxygen concentration at 3.0 wt %.

Reference Example 2

Partial Hydrogenation Followed by Epoxidation of a Diene Block Copolymer

A block copolymer (polystyrene-polybutadiene-polystyrene, by JSR Corp. commercially named TR2000) 300 g, and cyclohexane 3000 g were charged into a reaction vessel equipped with a jacket, a stirrer, a reflux condenser, and a thermometer.

Separately, a hydrogenation catalyst was prepared: di-P-trisbis (1-cyclopentadienyl) titanium/cyclohexane solution (conc.: 1 milli mol per litter) 40 ml and n-butyl lithium solution (CONC.: 5 milli mol/liter) 8 ml were mixed each other at 0° C. in the presence of hydrogen gas at a pressure of 2.0 kg/cm2.

The hydrogenation catalyst thus obtained was charged into the reaction vessel, and the hydrogenation reaction was kept for 30 min. at 60° C. at a pressure of 2.5 kg/cm$^2$ (by hydrogen partial pressure), and the resultant solution thus performed was subjected to vacuum drying to remove the solvent. It was found with the recovered product whose hydrogenation degree of overall butadiene block involved was 30%.

Then the process proceeded to the epoxidation. The partially hydrogenated block copolymer as described above 300 g was charged into the vessel together with cyclohexane 1500 g, and ethyl acetate 1500 g, and an ethyl acetate solution 285 g containing peracetic acid 30 wt % was instilled continuously thereinto and the reaction was kept for 3 hours at 40° C. with stirring. Thereafter, the reactant solution was cooled and discharged, and separated with methanol, and filtered, washed and dried in the same manner as described above. It was found that the recovered epoxidized-partially-hydrogenated diene copolymer had an oxirane oxygen conc. at 5.2 wt %.

DESCRIPTION OF THE INVENTIVE EMBODIMENTS

Example 1

A formulated resinous composition shown in Table 1 below was compounded or kneaded by a laboratory-size test mill at 140° C., at a rotation rate of 100 rpm for 10 min, and kneaded or blended composition was removed. In order to check the mixture status, a bit of the blended composition was removed or sampled to be imaged by SEM technique, of which appearance is shown in FIG. 1. As is seen, the blended composition generally consists of, so called, sea and island formation, wherein the sea part is of Comp. A, and the island part is of Comp. B+C which is dispersed in the form of particles or islands of about 10 microns in size, wherein black spots entangling with white spots are of Comp. C.

Apart from the imaging, the blended remnant composition or test sample was molded by a two roll machine, known in the art, into a sheet of 0.5 mm thickness, and thereafter sheet properties were checked on the suitability to heat fusion by a high frequency (HF) welding machine which was well applied to the processing of vinyl chloride compounds as noted above, and also on the suitability to further moldability, and also on an appearance of such product in the form of sheet or film. Such assessments are, as shown in Table 2, well comparable to traditional vinyl chloride compounds or products. Therefore, the inventive resinous product has acquired the conformity with facilities or apparatus existing for processing the vinyl chloride compounds.

When a foamed product was intended, a foaming agent which was known in the art for foaming vinyl chloride resin was included beforehand in the inventive blend formulation, and such art is referenced by Japanese Unexamined Patent Publication Hei 8-20661/1996.

TABLE 1

| | |
|---|---|
| (Comp. A) Olefinic thermoplastic resin (Sumitomo Chemical, commercially named: Sumitomo TPE-4762) | 70 wt. parts |
| (Comp. B) Acrylonitrile-styrene-alkyl acrylate copolymer (Goodyear, commercially named: SUNIGUM P7395) | 30 wt. parts |
| (Comp. C) Epoxy resin (prepared by the reference example 1 or 2 noted above) | 5 wt. parts. |
| Phosphite antioxidant (Asahi Denka, commercially named: AO-60) | 1 wt. part. |
| Phenol antioxidant (Asahi Denka, commercially named: PEP-36) | 0.1 wt. part. |
| Slipping agent (Asahi Denka, commercially named: LS-5) | 0.3 wt. part. |

TABLE 1-continued

| | |
|---|---|
| Pigment (Tokushu Shikiryo, commercially named: MBE-11690) | 5 wt. parts. |

TABLE 2

| | Example 1 | Comparative Ex. 1 (below) |
|---|---|---|
| Suitability to HF welding | Acceptable | Failure |
| Suitability to molding | Acceptable | Failure |
| Appearance of Product | Acceptable | Failure |

Comparative Example 1

In this embodiment, operations were performed in the same manner as described in Example 1 except for the elimination of component C from the formulation.

Figure 2:
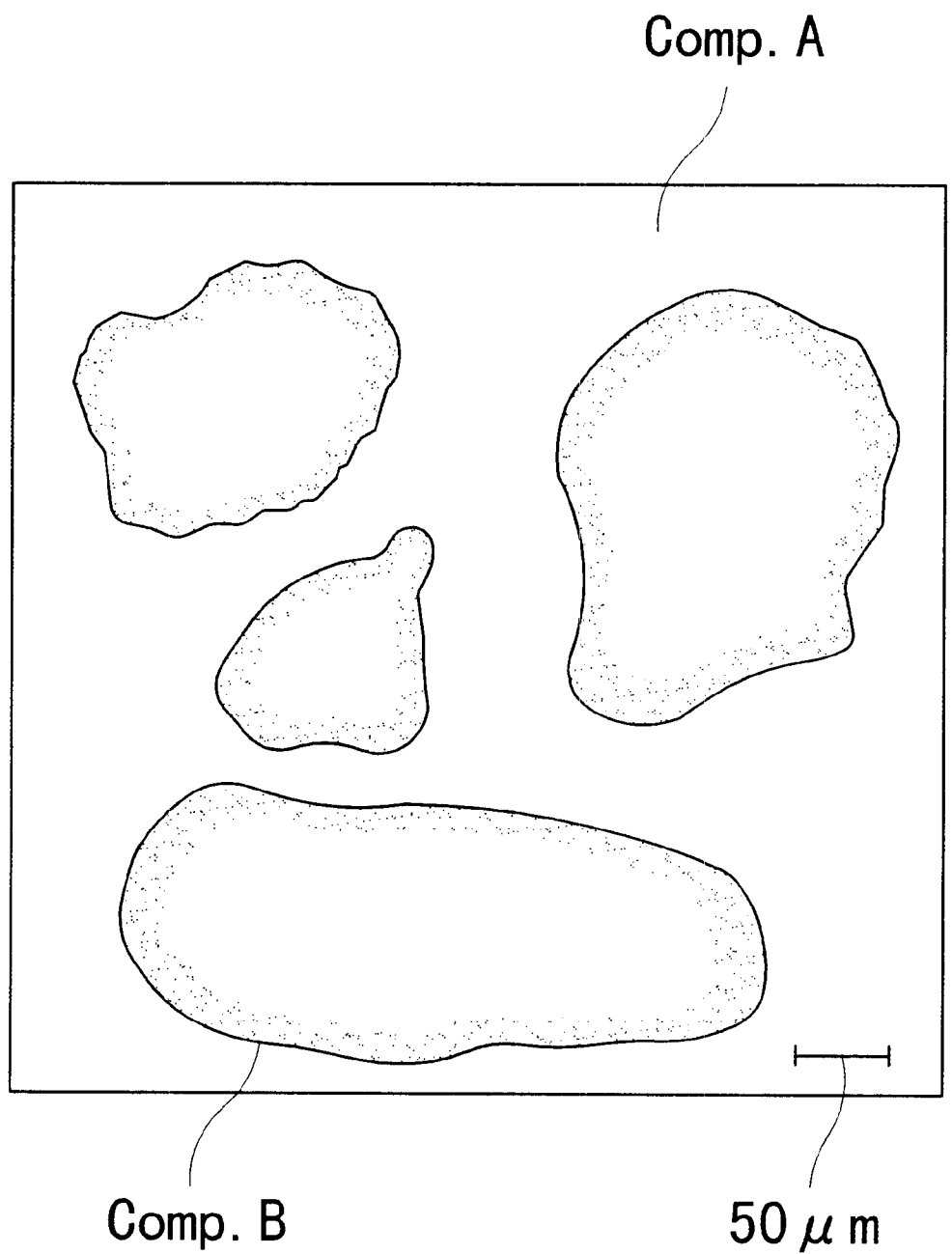
FIG. 2 shows the reproduction of a photograph imaged by SEM for illustration of a mixture status found in a resinous composition of the control or comparative example comprising an olefinic thermoplastic resin (Comp. A), an acrylonitrile-styrene-alkyl acrylate copolymer (Comp. B), wherein Comp. C is omitted.

After the kneading step, a bit of blended resin was sampled and imaged by the same SEM technique and was shown in FIG. 2. Therein the same, sea and island formation was apparent, but the island part (Comp. B) is dispersion in the form of particles much coarser than in the case of FIG. 1 or the Example 1, wherein the reference scale in FIG. 1 is by 2 microns in contrast to that by 50 microns in FIG. 2. Accordingly, its particle size ranges much bigger than several tens microns, which proves how inferior interdispersion or compatibility was resulted.

Apart from the imaging, blended remnant sample was molded to a sheet product, of which properties are of impaired level as shown in Table 2 above.

An attempt to acquire a resinous composition with utility of substitution for plasticized vinyl chloride compound was made by the combination of polyolefin (assumed as substitution for vinyl chloride resin proper) with acrylonitrile-styrene-alkyl acrylate (assumed as substitution for plasticizer), but the result fell short of achieving the properties comparable to a plasticized vinyl chloride compound. It is clear from FIG. 2 which shows inferior interdispersion or compatibility between the assumed resin proper and the assumed plasticizer, but the incorporation of an epoxy compound brings about dramatic improvement in the compatibility as shown in FIG. 1.

What is claimed is:

1. A resinous composition comprising:
   (A) 99 to 1 parts by weight of an olefinic thermoplastic resin;
   (B) 1 to 99 parts by weight of an acrylonitrile-styrene-alkyl (meth)acrylate copolymer; and
   (C) 1 to 100 parts by weight based on 100 parts of (A+B) of an epoxy group-containing resin, wherein (C) is selected from the group consisting of epoxidized diene block copolymers including, in their molecules, a block prepared by polymerization from a vinyl aromatic monomer and another block prepared by polymerization from a conjugated diene monomer, wherein remnant diene groups after the polymerization have been epoxidized or epoxidized after partial hydrogenation.

2. A resinous thermoplastic composition according to claim 1, wherein (C) includes epoxy groups at a concentration of 0.2 to 6.0 wt. % on an oxirane basis.

3. A sheet product prepared from a resin composition according to claim 1 or 2.

* * * * *